Feb. 2, 1926.
E. FOSTER
1,571,518
APPARATUS FOR REDUCING AND DRYING CASEIN CURD
Filed Dec. 12, 1922
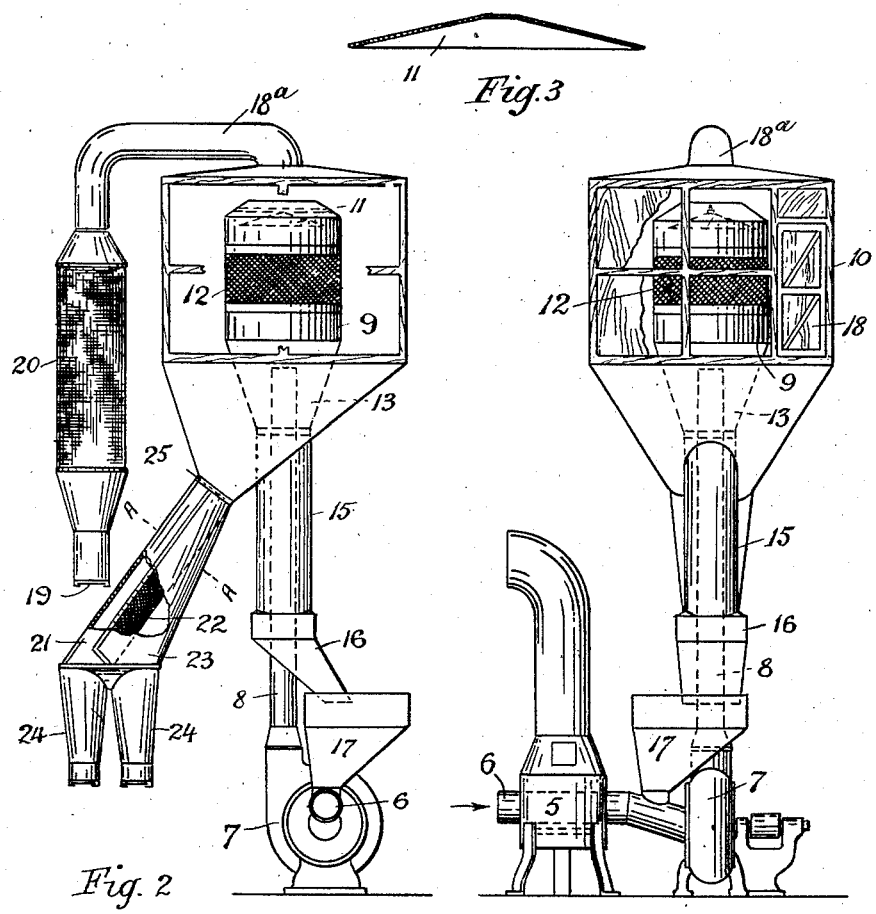
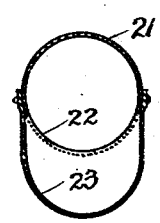

Patented Feb. 2, 1926.

1,571,518

UNITED STATES PATENT OFFICE.

ERNEST FOSTER, OF NORTH BRUNSWICK, VICTORIA, AUSTRALIA, ASSIGNOR TO VERMONT CASEIN PTY, LTD., OF MELBOURNE, VICTORIA, AUSTRALIA, A BRITISH COMPANY.

APPARATUS FOR REDUCING AND DRYING CASEIN CURD.

Application filed December 12, 1922. Serial No. 606,500.

*To all whom it may concern:*

Be it known that I, ERNEST FOSTER, a subject of the King of Great Britain, residing at 88 Cassells Road, North Brunswick, in the State of Victoria, Commonwealth of Australia, engineer, have invented a certain new and Improved Apparatus for Reducing and Drying Casein Curd, of which the following is a specification.

This invention has for its object the extraction of moisture from casein to render it fit to be used in manufactures.

At present the wet or raw curd is taken in bulk and passed through a chopping machine and then spread upon canvas trays and heated. Such a process is objectionable in that the heat is not applied evenly and thoroughly to the surfaces of the material, which is liable to set up fermentation on that part in contact with the canvas. The ferment produces discoloration in the casein which affects its appearance—an important consideration where clarity in the product is desired.

It is to avoid such happening and to extract evaporable fluid such as water from the wet or raw curd that this invention has been devised, according to which the curd is first broken into lumps of about half a pound weight and impelled in the presence of a maintained blast of heated air along a vertically disposed conduit towards an obstructing plate. Impact upon the plate breaks it up, but not finely, owing to the retained moisture, and in order to further disintegrate the material in complete contact with the hot air, the curd, after being impelled for the first time against the plate, is returned to the starting point by gravitation and again driven with the hot blast against the plate. This is repeated several times. The plate is within a lantern or container having gratings or screens in the sides, of a mesh according to the size required. When the material has been sufficiently reduced in size and dried it will pass through the screens and gravitate to graders prior to being bagged.

As the curd dries, a certain quantity of fine dust is produced. This material in suspension is carried away from a chamber surrounding the container through an exhaust pipe in which is a silk bag or other suitable device, that filters the air as it escapes and retains the fine particles.

The result is a well dried and clean casein product, evenly graded, that can be treated by ordinary and well-known processes of manufacture with satisfactory results.

The apparatus I employ for my purpose is illustrated in the accompanying drawings, in which Fig. 1 is a front elevation of the machine, and Fig. 2 a side elevation of the same, the furnace not being seen.

Fig. 3 shows the dished impact plate, in section, and

Fig. 4 is a section through the grading means on the line A—A of Fig. 2.

The furnace 5 receives an air pipe 6 open to the atmosphere and which leads into a blower and heater 7 that is driven by a belt or motor. Rising vertically from the blower casing is a vertical pipe 8 that terminates within a container 9 which is itself within a room or chamber 10. In the roof of the container, coaxial with the pipe 8, is a disc 11 that is preferably concave and that is held in the roof by suitable means. In the container, preferably about its waist, is a screen 12 which may be, say of 40 mesh with openings about as large as a pin head. Below the container proper is a space enclosed by an annular curtain 13 that joins the container with a pipe 15 that is around the upcast pipe 8 and leads to a chute 16 that delivers into the feed chute 17 connected to the hot air pipe 6. In the throat of 17 a valve or shutter may be placed to regulate the feed. A door 18 is in the chamber 10 through which admission to the chamber apparatus is possible and the whole machine is suitably supported in a building constructed for the purpose and not shown in the drawing.

From the roof of the chamber 10 an exhaust pipe 18ª is led, the other end of which is closed by a shutter 19. Interposed in the exhaust pipe is an enlarged chambers 20 having silk walls through which the air blown upwards from the blower 7 can escape while particles of casein held in suspension will be retained.

It will be possible to obtain results without the exhausting pipe 18ª and member 20, but in such case relief for the air pressure will be provided by making the chamber walls 10 with silk or other like material. In practice, however, I construct the walls of the chamber 10 with three ply boards and lead therefrom the exhaust pipe 18ª.

In operation, on starting the blower air will be drawn in by the pipe 6 and passed through the furnace to the pipe 8. At the same time lumps of raw curd are placed in the chute 17 and fed to the pipe. The blower will tend to break up the raw curd and force it, in the presence of the continuous hot blast, upwards through the pipe 8 with considerable force into the container 9 where it will strike the plate 11 and be further broken. The plate is formed concave in order that the broken material may be deflected sideways on to the annular removable screen 12, if such is placed in the waist of the container. The screen is such that only fine particles of the dried casein will pass through it, and the material that will not, after the first impact with the plate 11, be small enough to pass the screen will fall through the container into and down the sleeve pipe 15 and eventually again into the chute 17 whence it is passed again to the blower.

After this process has been repeated several times in the presence of the hot blast, the dried casein will be reduced to a size small enough to be passed through the screen into the chamber 10 from whence it will gravitate through a hopper into graders. These latter consist of two channels, one partly contained by the other. The first grader 21 consists of a pipe about one half of which is a screen 22 wholly enclosed by the containing member 23 that receives the smaller particles that pass through 22. The product of each pipe is conveyed to the legs 24 in which are shutters for withdrawing the graded material. Thus, three grades or sizes are recovered from the machine, namely flour of casein from the member 20, and a coarse and fine product from the pipes 21 and 23 respectively.

As the hot air is driven it swirls in the container and absorbs moisture from the casein curd, escaping into the chamber 10 and from thence through the pipe 18ª and silk balloon 20 to the atmosphere. To regulate the flow of the dried material from the chamber hopper to the graders a shutter 25 may be placed in the throat of the hopper.

Thus, the raw curd will be repeatedly dashed, in the presence of the hot air, against the obstructing plate and dried thoroughly and quickly to render the casein fit for the subsequent manufacturing processes for which it is intended.

Having now described my invention what I claim as new and desire to secure by Letters Patent is:—

1. In apparatus for drying casein, a blower including a fan and a casing, an air inlet duct leading to the casing, means to heat the air passing through said duct, a hopper on said duct, a discharge pipe extending upwardly from the blower casing, a container at the upper end of said pipe into which the latter discharges, said separator being provided in its upper side with a concave disk and a return pipe leading downwardly from the container and arranged to discharge into the hopper.

2. In apparatus for drying casein, a blower including a fan and a casing, an air inlet duct leading to the casing, a hopper on said duct, a discharge pipe extending upwardly from the blower casing, a separator at the upper end of said pipe into which the latter discharges, said separator being provided in its upper side with a concave disk and a return pipe leading downwardly from the separator and arranged to discharge into the hopper.

3. In apparatus for drying and reducing casein, a blower including a fan and a casing, a hopper arranged to discharge into said casing, a discharge pipe leading upwardly from the casing, a separator at the upper end of said pipe and in to which the latter discharges, said separator having a concave disc in its upper portion, a return pipe leading from said separator and arranged to discharge into said hopper, a structure forming a chamber in which said separator is arranged and a grader at the bottom of said chamber.

In witness whereof I affix my signature.

ERNEST FOSTER.